METHOD AND APPARATUS FOR MAGNETIC RECORDING IN A BORE HOLE

Filed May 10, 1952 3 Sheets-Sheet 1

INVENTOR.
EDWARD W. JAMES
BY
Busser, Smith & Harding
ATTORNEYS.

INVENTOR.
EDWARD W. JAMES
BY
Bessos, Smith & Harding
ATTORNEYS.

March 24, 1959 E. W. JAMES 2,879,126

METHOD AND APPARATUS FOR MAGNETIC RECORDING IN A BORE HOLE

Filed May 10, 1952 3 Sheets-Sheet 3

INVENTOR.
EDWARD W. JAMES
BY
Busser, Smith & Harding
ATTORNEYS.

United States Patent Office 2,879,126
Patented Mar. 24, 1959

2,879,126

METHOD AND APPARATUS FOR MAGNETIC RECORDING IN A BORE HOLE

Edward W. James, Newton Square, Pa., assignor to Sun Oil Company, Philadelphia, Pa., a corporation of New Jersey Application May 10, 1952, Serial No. 287,205

5 Claims. (Cl. 346—74)

This invention relates to method and apparatus for logging or surveying a bore hole and, more particularly, to magnetic recording within a bore hole.

It is common practice in the art to lower instruments into bore holes for the purpose of making a record of conditions existing within or surrounding the hole. This apparatus may be of the type which provides a recording within a self-contained unit which is lowered into the hole or, alternately, of the type which transmits signals to the surface of the earth in response to conditions existing in the vicinity of the instrument, the transmitted signals being recorded by suitable apparatus at the surface of the earth.

The latter type apparatus involves the difficulty of long wire lines extended into the bore hole as the instrument is lowered therein and attendant interference with the drilling operation, or the difficulties involved in acoustic or other transmission methods if the wire line is to be avoided.

Recording by means of an instrument lowered into the bore hole has been accomplished by the use of electrochemical sensitive elements and by photographic means. The electrochemical type off recording has the disadvantage of being limited in the rate at which indications may be recorded. The photographic type of apparatus has the disadvantage in that the emulsions involved in the photographic film and the material supporting the emulsions are adversely affected by the elevated temperature conditions generally existing in deep bore holes, and the difficulties attendant to handling light sensitive materials.

In brief, the present invention relates to a system for sensing a variable, translating that variable to a signal, coding the signal, and recording the coded signal on a magnetic tape or wire in such a manner that, when the record obtained is played back, the various recorded signals may be interpreted as measurements of the variable. The system is divided into two parts, one part being a sensing and recording unit which must be located at the place where the variable to be measured is available to the pick-up, and the second part being a play-back unit which may be located in a laboratory and which provides a visual record of the functions recorded.

The recording apparatus may be mounted in a suitable protective casing of the type conventionally employed for running instruments into a bore hole and may be lowered into a bore hole on wire line or preferably run down a drill stem go-devil fashion and recovered when the drill stem is removed from the hole.

It is an object of the present invention to provide magnetic recording apparatus for recording a variable by means of a self-contained apparatus within a bore hole and producing a record which can be removed from the apparatus and forwarded to a laboratory where the recording can be played back on a suitable play-back unit.

It is a further object of the invention to provide simple recording apparatus which is of rugged construction and able to withstand the high temperatures existing in bore holes.

It is a further object of the invention to provide apparatus having large capacity and high resolution, capable of accuracies obtainable through electronic means without the use of electronic means in the recording unit, and requiring no elaborate manipulation in the field.

These and other objects of the invention will become apparent from the following description when read in conjunction with the accompanying drawings, in which.

Figure 1:
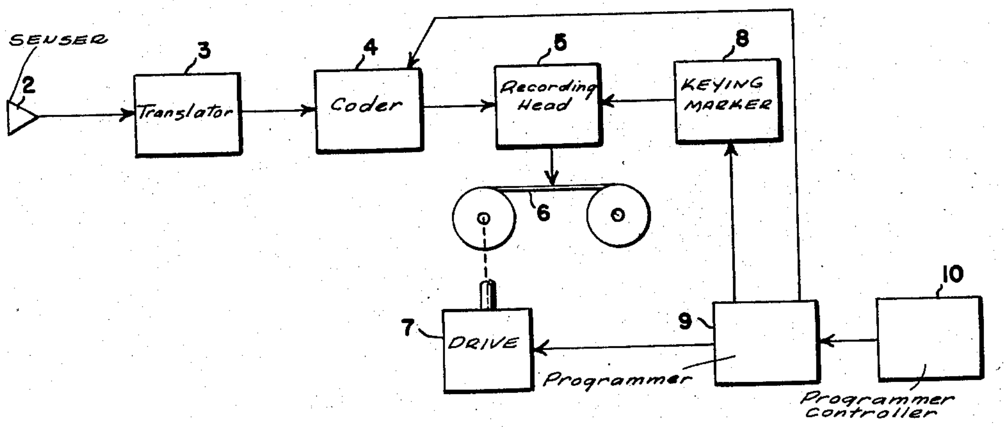
Figure 1 is a schematic representation of the recording apparatus involved in the invention.

Referring to Figure 1 there is shown at 2 a pick-up or senser which is adapted to sense a variable and convert the variable to electrical, magnetic or mechanical signal. The variable may be any variable from which can be derived a systematic signal indication. In a bore hole such a variable may be, for example, inclination, temperature, magnetic field, electrical constants of the surrounding earth and numerous other variables.

The signal produced by the pick-up is delivered to a translator 3 which is employed to amplify the signal, if necessary, and to convert the signal into a suitable form, such as will be hereinafter described, for delivery to a coder 4 which converts the signal to a coded pulse signal and transmits the coded pulse signal to a recording head 5.

Two types of signals may be used as between the coder and recording head, namely, either a series of electrical pulses or a series of magnetic pulses and these pulses may then be recorded on a magnetic tape or wire 6.

Figure 3:
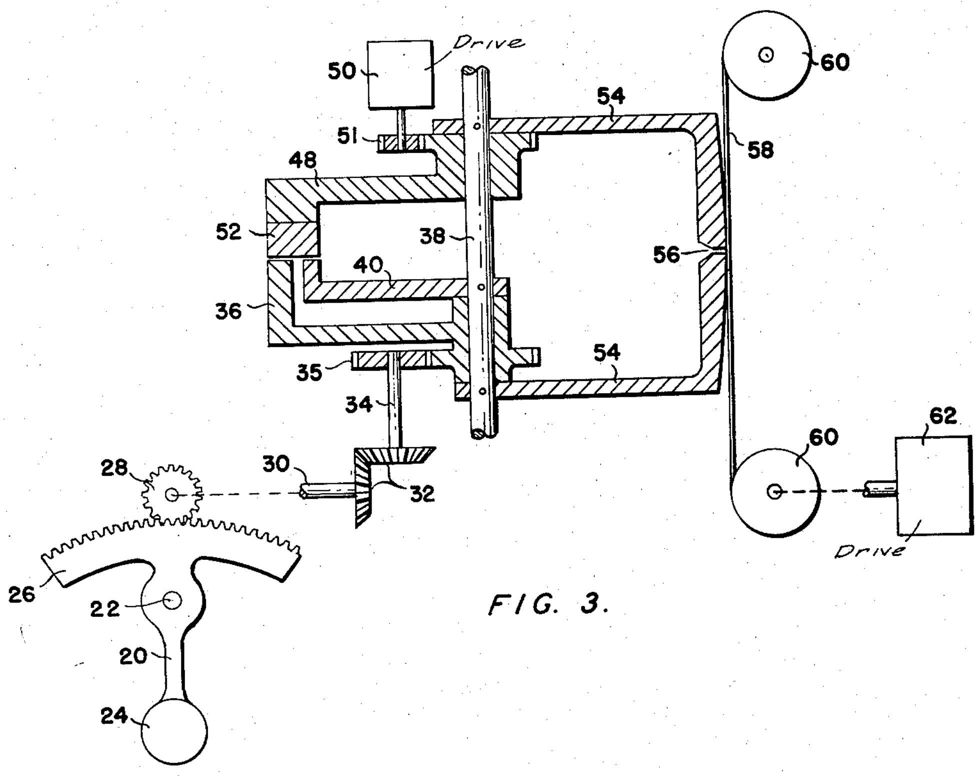
Figure 3 shows mechanical details of a portion of the apparatus shown in Figure 1.

In Figure 3 there is shown apparatus for sensing inclination. The apparatus involves a pendulum member 20 pivotally mounted on a stationary pin 22 and having at its lower end a weight member 24 and at its upper end a rack gear 26. The pinion gear 28 is adapted to be rotated by the rack gear as the pendulum 20 is displaced from a normal position. Rotation of the pinion gear 28 is transmitted through a shaft 30, gears 32, shaft 34 and gear 35 to a movable arm 36 which is rotatably mounted on the shaft 38. As the pendulum is displaced from a normal vertical position with respect to the instrument housing as a result of inclination of the bore hole into which the instrument is lowered, the arm 36 will be displaced from its normal position on the shaft 38. Rigidly mounted to the shaft 38 is a fixed reference arm 40. The degree of displacement of the movable arm 36 from the reference arm 40 will obviously depend upon the degree of displacement of the pendulum member from its normal position. Thus the variable, inclination, has been translated into a displacement of a signal arm.

Figure 4:
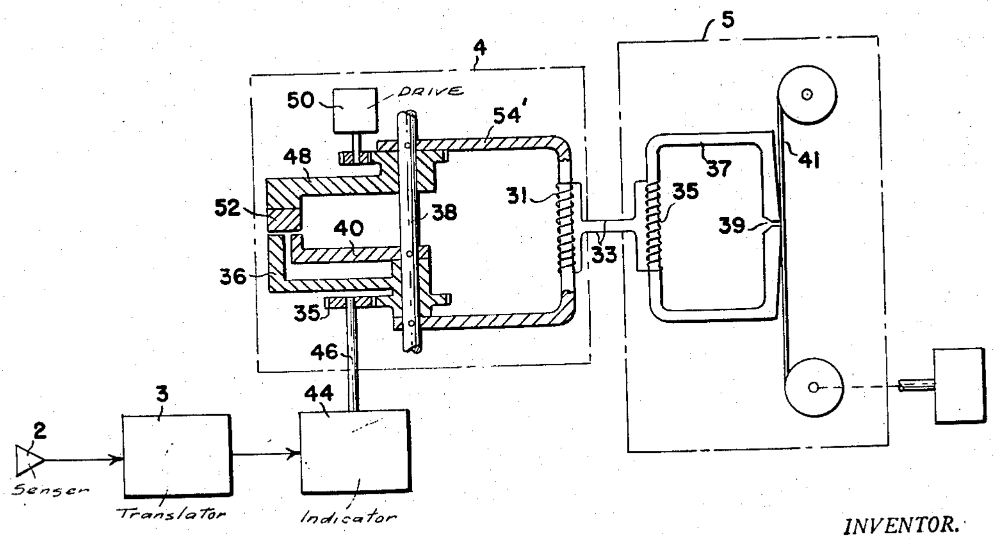
Figure 4 shows an alternate form of the apparatus shown in Figure 3.

An alternate form of apparatus for providing displacement of a signal arm in response to a variable is shown in Figure 4 in which the pick-up 2 may be any one of a number of well known pick-up devices suitable for sensing a variable, for example, such as a magnetic field or one of the electrical constants of the surrounding earth strata and, by means of appaartus shown diagrammatically at 3, that variable is translated to an electrical signal which is delivered to a suitable instrument 44 which causes the rotation of an indicating shaft 46. The instrument 44 may be, for example, an instrument capable of indicating variations in voltage, current or other electrical variable. Numerous arrangements of such detecting and translating apparatus for providing such indications are well known to the art. For example, the apparatus, such as is disclosed in the patents to J. W. Millington 2,398,800 or C. R. Nichols 2,428,034, could be employed herein. The rotatable indicator shaft 46 may be coupled to the gear 35 to provide a displacement of the signal arm 36, or an instrument pointer affixed to the shaft 46 may be positioned directly in place of the signal arm 36.

It will be evident that, by means such as these, a mechanical displacement of a signal arm may be produced in response to any of a great number of variables existing in the vicinity of the recording apparatus within a bore hole.

The coder shown in Figure 3 is provided with a scanning arm 48 rotatably mounted on the shaft 38 and driven by drive motor 50 through the gear 51. Affixed to the scanning arm is the permanent magnet 52, and mounted for continuous magnetic contact with the scanning arm 48 is the magnetically conductive yoke 54 which is provided with the recording gap 56. The yoke 54 is also in magnetic conductive relation to the magnetically conductive signal arm 36 and the fixed arm 40. Thus, each time the permanent magnet 52 passes over the end of either the fixed arm 40 or the displaced signal arm 36, a magnetic pulse passes through the yoke 54. Positioned adjacent to the recording gap 56 is a suitable magnetic wire or tape 58 which is carried by the reels 60 and provided with suitable reel drive 62.

By means of this apparatus, there will be recorded on the tape a series of reference pulses spaced apart by a time interval equal to one revolution of the scanning arm with respect to the fixed arm, and displaced from each of the reference pulse records by a distance equivalent to the displacement of the signal arm 36 from the reference arm 40 will be a second or signal pulse record. The displacement of the signal pulse record from the reference pulse record is a measure of the magnitude of the variable.

In the apparatus shown in Figure 4 the magnetic yoke 54' is provided with the coil 31 in place of a recording gap. As a result of the fluctuations of the magnetic field in the yoke 54, potentials are induced in the coil 31 and a current flow is transmitted by the wires 33 to a coil 35 in a recording head which is physically displaced from the coder. The coil 35 is wound around a yoke 37 which has a recording gap 39 adjacent to a recording tape 41. Thus the magnetic pulses produced in the coder enclosed within the outline 4 in Figure 4 are transmitted as electrical pulses and are then reconverted to magnetic pulses for recording on a magnetic tape in the recorder enclosed within the outline 5 in Figure 4.

While the coders shown in Figures 3 and 4 employ a sensing element in the form of the permanent magnet 52, it will be apparent that the magnetic sensing element may be replaced by a mechanical means such as the contacting of a switch arm to cause completion of an electrical circuit, optical means such as the passing of a light source over a phototube, electrical means such as a changing in capacitance or inductance, or magnetic means such as a tripping of a magnetic switch which in turn closes a circuit in order to produce pulse signals. The sensing element may alternately be a sensitive pick-up such as a piezo crystal, or it may only form part of a generating system such as a salient pole in a permanet magnet circuit. Both the reference marker and the signal marker may be either stimulators for the sensing element or, alternately, they may constitute part of the sensing element itself. Any of these various means, including the means shown, may be adapted to provide signal pulses in response to the passage of a sensing element mounted on a scanning arm over a fixed reference arm and a displaced signal arm.

It will be evident, however, that the coding apparatus shown in Figures 3 and 4 is preferable to any of these various alternate forms of coding apparatus inasmuch as the apparatus shown in the figures is of simple and rugged construction, does not require electronic equipment, and is not dependent upon the operation of mechanical or magnetic switch operated means.

It will also be evident that, if any of the various alternate sensing elements as listed above are employed, the output of the coder will be a sequence of electrical pulses which may be transmitted to a magnetic recording head such as shown within the outline 5 in Figure 4.

While the apparatus shown in Figures 3 and 4 employs a rotating scanning arm 48, it will be evident that the scanning may also be an oscillating scan either linear or rotational, the primary difference being that, in an oscillating scan, a double pass is made over the reference and variable markers and thus a blocking device must be used during the pass in one direction. The arrangement shown in the figures is the preferable arrangement in that it is less complicated mechanically than a device for producing an oscillatory scan.

Alternately, a non-mechanical scan may be used, for example, the electrical rotation of a magnetic vector whose influence on the magnetic circuit surrounding it is such as to produce a signal whenever it passes a marker. This type of apparatus, however, has the disadvantage of requiring electronic equipment which is of less rugged construction and of lesser ability to withstand the high temperatures existing in deep bore holes than the mechanical scanning shown in the figures.

The output of the coder may be a train of pulses as has been described or, alternately, may be a wave which shows the same information. For example, the phase of a wave may be used to show the signal information and the period of a wave may show the reference pass. Waves such as these might be produced by apparatus substantially the same as that shown if the scanning arm 48 were replaced with a rotating disc providing a continuous output of the coder in wave form.

Referring again to Figure 1 there is shown at 7 means for driving the reels carrying the recording tape 6. The reel drive apparatus may be adapted to drive the reel continuously or intermittently. In the event an intermittent drive is used, as will be hereinafter described, there is provided a programmer 9 which is adapted to control the reel drive mechanism and also to control the keying marker 8 which may feed a signal to the recording head 5 or, alternately, may feed a signal to a separate recording head. The programmer will key or initiate the keying marker and may also be provided to control the delivery of the train of pulses from the coder to the recording head 5 by controlling the output of the coder. The programmer may be controlled by control means 10 as will be hereinafter described.

By means of reel drive apparatus and keying marker apparatus, both controlled by a programmer, the recording tape may be fed intermittently either in bursts during recording intervals with the tape running only during recording intervals, or intermittently with the tape stationary during recording intervals and the recording head moving during the recording intervals, and the records may be reproduced by a reproducer controlled in response to the keying recordings.

Figure 5:
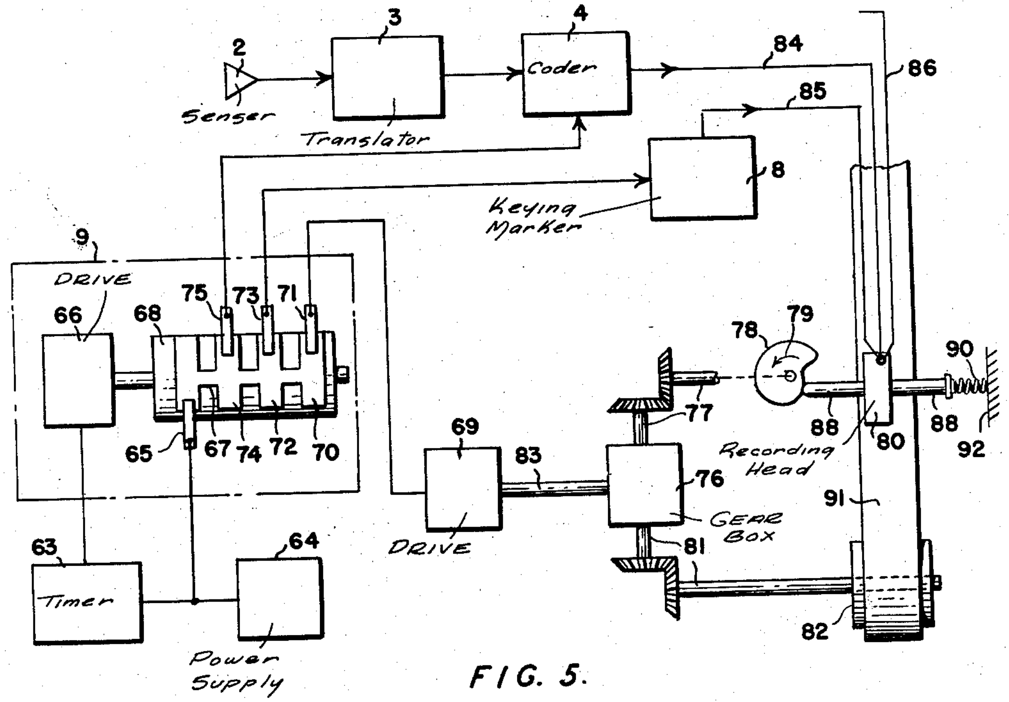
Figure 5 shows mechanical details of a form of the recording apparatus referred to schematically in Figure 1.

In Figure 5 there is shown apparatus by means of which trains of signals are recorded transversely of the recording tape, and the recording tape is driven intermittently between successive transverse passes of the recording head. This type of recording generally provides a much greater utility of the tape area by permitting the recording of a greater number of signals per unit length of tape than may be recorded when the tape is passing continuously past the recording gap as shown in Figures 3 and 4.

Referring to Figure 5 there is shown within the outline 9 a programmer. The programmer includes a drive motor 66 which is adapted to drive a drum 68. A power supply 64, which is preferably in the form of batteries suitable for disposition in a bore hole instrument, is connected to the drive motor 66 through a timer 63. This timer may be any suitable clockwork mechanism such as, for example, that disclosed in the patent to Roland Ring, No. 2,559,373, issued July 3, 1951, which may be adapted to supply current to the motor 66 to operate the programmer for a definite period of time or, alternately, to supply the programmer drive motor 66 with power during a plurality of predetermined operating intervals separated by predetermined rest intervals. By such means it is possible, for example, to lower the apparatus into a bore hole and make a succession of recordings spaced both in time and in position within the bore hole.

The drum 68 is made of insulating material and has disposed on its surface a plurality of conductive straps 70, 72 and 74 which are connected to the source of power 64 through the brush 65 and the straps 67. Contact brushes 71, 73 and 75 are adapted to contact the conductive straps 70, 72 and 74, respectively, and to deliver power to the various elements of the apparatus, as will be described, to control the operation thereof during the period of passage of the brushes over the conductive straps. The respective lengths and positions of the various straps will determine the relative periods of operation of the various elements of the apparatus controlled thereby.

The conductor connected to the brush 71 is adapted to carry current to the motor 69 which is connected through shaft 83 to drive the gear box 76. The cam 78 is driven from the gear box 76 through the gear and shaft arrangement 77.

A recording head 80 is mounted on a bar 88 which is urged to the left, as viewed in the figure, by the spring 90 acting between the end of the bar 88 and the abutment 92. The recording head, which preferably consists of a recording head such as is shown within the outline 5 of Figure 4, is positioned to engage a recording tape 91. As the cam 78 rotates in the direction indicated by the arrow 79 the recording head will be moved to the right across the recorder tape at a uniform rate of speed until the head reaches an extreme right-hand position whereupon the rise of the cam is completed, and the cam follower will fall to the lower portion of the cam thereby returning the head rapidly to the left-hand side of the tape. The portions of the surface of the cam adjacent to the fall may be contoured in order to minimize the shock to the returning recorder head and to provide a sufficient time interval for the tape to advance without there being a coincident travel of the recording head across the tape. The signal frequency must be such, however, that no signals occur during this period of return of the recording head across the tape.

The recording tape 91 is mounted on the reel 82 and the reel 82 is driven from the gear box 76 through the gear and shaft arrangement 81. The gear box contains suitable gear mechanism for continuously driving the cam 78 and also mechanism, for example, a Geneva drive arrangement to drive the tape reel 82 intermittently in order to advance the tape at intervals coincident with the return of the recording head 80 to the left-hand side of the tape as viewed in the figure.

There is shown schematically in Figure 5 a pick-up unit 2, a translator 3 and a coder 4. These elements of the apparatus may be of any of the various forms hereinbefore described. The output of the coder 4 is fed through the flexible conductor 84 to the recording head 80.

The programmer 9 also provides for the transmission of power to the coder 4 if it is desired to provide for intermittently driving the scanning arm of the coder. This power is supplied by the brush take-off 75 and is delivered to the scanning arm drive motor such as the motor 50 shown in Figures 3 and 4. The programmer also controls the operation of the reference marking or keying apparatus 8 by power supplied by the brush take-off 73, as will be hereinafter described. Thus, by means of the programmer, recording may be accomplished for a period of time equivalent to, for example, several passes of the recording head transversely of the tape and then for a predetermined period of time the apparatus may be at rest. During this period of rest the entire apparatus may be repositioned in a bore hole in a location at which a successive recording is to be accomplished. Alternately, the apparatus may be run into a drill stem go-devil fashion to the bottom of the drill stem adjacent to the drill bit and provide, by means of the operation of the clockwork timer control 63, a succession of recordings of conditions of the bore hole adjacent to the drill bit.

The clockwork timer 63 may be replaced by other suitable sequence controlling means such as apparatus which will operate in response to a signal received from the surface of the earth. Such a signal could be transmitted, for example, electrically, acoustically, or mechanically such as by drill stem rotation, to initiate a desired cycle of operation through suitable control means.

The output of the programmer brush 73 is delivered to the keying marker 8 and serves to energize the marker and initiate the production of reference signals which are delivered to line 85 and recorded on the tape by the recording head 80. Alternately, the output of the keying marker may be delivered to an individual recording head and the keying marks recorded thereby.

The keying marker may be used to produce, by various means well known in the art, the reference signals at the proper time to be recorded on the tape in proper reference to the signal pulse. Such keying marks may be used for sequencing or positioning the tape for playback. One typical application for keying marks is to provide indications of the depth of the bore hole at which the coded record is being made on the record tape. In such an application a separate pick-up and translator would be employed to provide to the keying marker 8 a signal related to depth.

An alternate use for keying marks is in identifying the variable in the event that a multi-channel system is employed. It will be evident that a plurality of pick-ups may be provided which will each deliver through a translator and a coder suitable signals to either a single recording head such as 80, or to individual recording heads, coded pulse trains relative to the variable being recorded. In such an application, the keying marks may be recorded by means of a separate recording head positioned, for example, along the edge of the tape. Alternately, all of the various coded signals, as well as the keying marks, may be recorded by means of a single record head and the coded keying marks employed to identify each of the successive variables recorded.

In such applications, one or more lines, such as 86 shown in Figure 5, may each be connected to the output of individual pick-up translator and coder circuits.

Keying marker 8 may take the form of a clockwork mechanism, such as previously described, or a suitable timing circuit. Alternately, the keying marker may be incorporated in the programmer 9, for example, by means of gaps or interruptions in the conductive portion of the band 70 engaged by the contact 71. It should be noted that, if multi-channel recording is being done and a single recording head employed, the programmer must then sequence the variables being recorded, and a keying marker must be employed to identify each of the variables recorded. Under these conditions, the programmer may conveniently be employed to provide the keying marks.

While the apparatus shown in Figure 5 provides for an oscillating recording head moving transversely of the tape, it will be evident that the apparatus can be equally well arranged to provide oscillatory motion longitudinally to the direction of travel of the tape.

Figure 6:
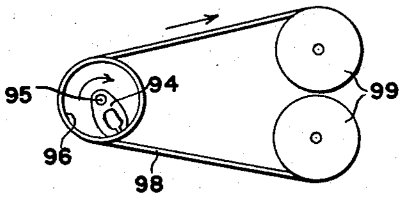
Figure 6 shows an alternate arrangement of the recording head and tape shown in Figure 5.
Figure 7:
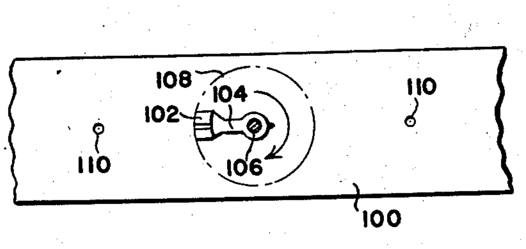
Figure 7 shows another alternate arrangement of the recording head and tape shown in Figure 5.

Alternately, rotary travel of the recording head may be provided as shown in Figures 6 and 7. In Figure 6, the recording head 94 is mounted for rotation on a shaft 95 within a non-magnetic cylinder 96 which serves to guide the recording tape or wire 98 which is carried by the reels 99. In this arrangement, the recording tape is advanced and then held stationary while the recording head makes a rotary pass recording a sequence of pulses on the recording tape positioned adjacent thereto. The recording tape is then advanced and a new portion of the tape is placed in position on the non-magnetic cylinder to record pulses during the next pass of the recording head. In such an arrangement the rotations of the recording head may be either continuous or intermittent and the drive mechanism may be similar to that shown in Figure 5 with the addition of suitable slip rings to carry the current to the rotating recording head.

In Figure 7 there is shown a recording tape 100 and a recording head 102 which is mounted on an arm 104 rotatably mounted on the shaft 106. In this arrangement the recording head 102 rotates about the circle indicated by the construction line 108 to produce a record on the tape in a circular pattern. After a recording is made, the tape is advanced and the next successive record pattern is recorded in a new location on the tape. In this form of recording a plurality of circular record patterns are provided successively along the tape. If desirable, the tape may be provided with holes 110 to provide for registry of the tape during both recording and play-back.

These various scanning arrangements provide for various efficiencies in the utilization of the tape area for recording signals. For normal operation, the intermittent transverse scan, such as is shown in Figure 5, is preferable in that it results in the largest capacity of the recording tape for signals. The intermittent transverse scan, however, as well as the intermittent longitudinal scan and the intermittent rotational scans, is useful only when the rate of occurrence of record pulses is low enough to allow the tape to be advanced between scans. In these methods, however, the rate of travel of the tape between successive recordings is not critical except that it should be sufficiently rapid to accomplish the tape advance between record pulses.

As the rate of occurrence of the signal pulses becomes high, it becomes more economical to use either the continuously running tape or a tape which runs in bursts, i.e., a tape which is advanced for a predetermined period during successive time intervals spaced between periods of rest. In this type of recording there will be periods of acceleration and deceleration and between them running periods during which recordings are made. Normally, a constant speed is required during both the continuous drive and during the recording period when the drive is in bursts to make absolute time measurements such as are required in pulse time modulation. The speed may be allowed to vary over a considerable range, however, if ratio measurements within one cycle are used rather than absolute measurements. Thus the scanning arrangement shown in Figures 3 and 4 has an added value in that constant tape speed is not required when records are made with the tape moving, and, if the rate of occurrence of the record pulses as is controlled by the rate of rotation of the scanning arm 48 is sufficiently low to permit the use of intermittent tape motion with the recording head moving over the tape during recording periods, the various recording methods as have been described in connection with Figures 5, 6 and 7 may be employed in order to effect the most efficient use of the tape area. Of these, the intermittent transverse scan is the most efficient in terms of utilization of tape area.

It will be evident that the previously described apparatus in any of its various forms may be mounted within a suitable protective casing of the type conventionally used for running instruments down into a bore hole. The apparatus requires no elaborate manipulation in the field and, after a recording has been made, the record tape upon removal from the apparatus may be forwarded to a laboratory where the records may be played back in a suitable play-back unit.

The reproduction of the coded information recorded on the magnetic tape to readable records may be accomplished automatically by the use of electronic circuits. The methods and circuits used to accomplish such a reproduction are well known in the art and do not constitute a part of this invention. The various units employed in the reproduction will, therefore, be only briefly described.

Figure 2:
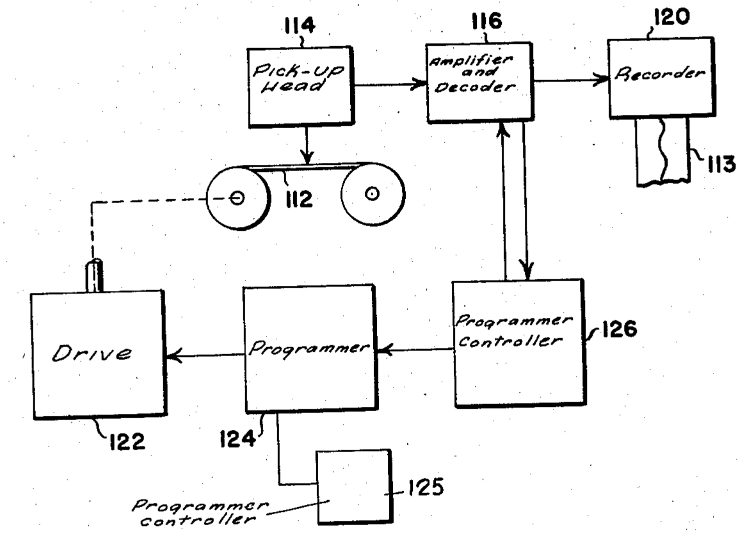
Figure 2 is a schematic representation of a suitable play-back apparatus.

A suitable play-back unit is shown diagrammatically in Figure 2 in which the tape 112 is a record tape which has been removed from the recording instrument previously described after pulse coded records have been made thereon together with the reference timing or keying marks. The play-back unit is intended to reproduce on an inked or photographic record paper 113 the original functions recorded by means of the coded record on the magnetic tape 112. The recorded code signals are picked up by a play-back head 114. The picked-up signals are amplified and decoded by apparatus 116, and the continuous record of the original variable is fed into a recorder 120 which may be a recording type of instrument such as a recording indicator or a photographic oscilloscope or other suitable instrument.

The play-back unit includes suitable reel drive mechanism 122 which is controlled by a programmer 124. The operation of the programmer 124 is controlled in response to the keying marks on the record tape 112 by means of the keying mark responsive unit 126 which also controls the operation of the decoder if the keying signals have reference to the recorded signals other than as an indication of tape travel.

Thus there is provided magnetic recording apparatus which may be of simple and rugged construction and capable of compact arrangement and which may be employed to record one or more variables in the form of a coded pulse train upon a magnetic recording element.

What is claimed is:

1. Apparatus for recording in a bore hole comprising means for sensing a variable, means for translating the variable into a displacement between an indicator and a reference, means for coding the degree of displacement between the indicator and the reference into a train of pulses, means for recording the pulse train on a record member, means for programming said coding and said recording to provide successive periods of recording during spaced time intervals, and means controlled by said programming means for producing reference signals for identification of said successive periods of recording, said recording means recording said reference signals in conjunction with the recording of said coded signals.

2. Apparatus for recording in a bore hole comprising means for sensing a variable, means for translating the variable into a mechanical displacement between an indicator and a reference, means for coding the degree of displacement between the indicator and the reference into a train of magnetic pulses, means including a recording head for recording the pulse train on an elongated magnetic record member, means for programming said coding and said recording to provide successive periods of recording during spaced time intervals, means controlled by said programming means for producing reference signals for identification of said successive periods of recording, said recording means recording said reference signals in conjunction with the recording of said coded signals, and means controlled by said programming means for moving said record member intermittently between successive periods of recording and holding said record member stationary during periods of recording.

3. Apparatus in accordance with claim 2 including means controlled by said programming means for moving said recording head for transverse oscillation with respect to said record member as a recording is made.

4. Apparatus in accordance with claim 2 including means for moving said recording head longitudinally with respect to the record member as a recording is made.

5. Apparatus in accordance with claim 2 including means for moving the recording head circularly over the record member as a recording is made.

References Cited in the file of this patent

UNITED STATES PATENTS

| | | |
|---|---|---|
| 508,614 | Henry | Nov. 14, 1893 |
| 2,026,330 | Tauschek | Dec. 31, 1935 |
| 2,370,134 | Begun | Feb. 27, 1945 |
| 2,427,421 | Rieber | Sept. 16, 1947 |
| 2,479,518 | Scherbatskoy | Aug. 16, 1949 |
| 2,534,841 | Wallace | Dec. 19, 1950 |
| 2,539,553 | Rich | Jan. 30, 1951 |
| 2,550,427 | Potts | Apr. 24, 1951 |
| 2,579,831 | Keinath | Dec. 25, 1951 |
| 2,623,805 | Sewell | Dec. 30, 1952 |
| 2,640,275 | Boucher | June 2, 1953 |
| 2,648,589 | Hickman | Aug. 11, 1953 |